US 8,572,275 B2

(12) United States Patent
Heggenhougen et al.

(10) Patent No.: US 8,572,275 B2
(45) Date of Patent: Oct. 29, 2013

(54) METHOD, SYSTEM AND SOFTWARE FOR DYNAMICALLY EXTRACTING CONTENT FOR INTEGRATION WITH ELECTRONIC MAIL

(75) Inventors: Rolv E. Heggenhougen, Ft. Lauderdale, FL (US); Sergei Selin, Ft. Lauderdale, FL (US)

(73) Assignee: Wrapmail, Inc., Fort Lauderdale, FL (US)

( * ) Notice: Subject to any disclaimer, the term of this patent is extended or adjusted under 35 U.S.C. 154(b) by 821 days.

(21) Appl. No.: 11/543,566

(22) Filed: Oct. 5, 2006

(65) Prior Publication Data

US 2007/0083602 A1    Apr. 12, 2007

Related U.S. Application Data

(60) Provisional application No. 60/724,118, filed on Oct. 6, 2005.

(51) Int. Cl.
*G06F 15/16* (2006.01)

(52) U.S. Cl.
USPC .......................................... 709/232; 709/205

(58) Field of Classification Search
USPC ......... 709/232, 205, 206, 207, 217, 218, 219, 709/224, 226, 245
See application file for complete search history.

(56) References Cited

U.S. PATENT DOCUMENTS

| 6,446,115 | B2 | 9/2002 | Powers | 709/206 |
| 6,480,884 | B1 * | 11/2002 | Saito | 709/207 |
| 6,823,367 | B1 * | 11/2004 | Wakasugi et al. | 709/206 |
| 7,003,724 | B2 * | 2/2006 | Newman | 715/273 |
| 7,213,064 | B2 * | 5/2007 | Smith et al. | 709/223 |
| 7,392,289 | B2 | 6/2008 | Curry et al. | 709/206 |
| 7,418,440 | B2 * | 8/2008 | Kubaitis | 707/3 |
| 7,640,184 | B1 * | 12/2009 | Lunt | 709/217 |
| 2002/0078158 | A1 * | 6/2002 | Brown et al. | 709/206 |
| 2005/0027781 | A1 * | 2/2005 | Curry et al. | 709/200 |
| 2005/0223065 | A1 * | 10/2005 | Simchis et al. | 709/206 |

FOREIGN PATENT DOCUMENTS

WO    PCT/US99/27068    5/2000

* cited by examiner

*Primary Examiner* — Ruolei Zong
(74) *Attorney, Agent, or Firm* — Peter S. Canelias

(57) ABSTRACT

The invention is a system and method, with implementing computer program code, that automatically and dynamically formats an electronic mail (e-mail) message by extracting selected text and graphical components of a web page and "wrapping" the extracted computer data about the e-mail message. Thus the extracted data forms a border about the e-mail message. The invention provides for the use of company designs and trademarks in e-mail messages without the addition of local software components resident on the user's computer, and without compromising the functionality of standard e-mail software programs. The invention wraps the e-mail received through a gateway server and sends out the wrapped e-mail to the destination (recipient) designated by the sender in the original, unwrapped message.

24 Claims, 9 Drawing Sheets

METHOD, SYSTEM AND SOFTWARE FOR DYNAMICALLY EXTRACTING CONTENT FOR INTEGRATION WITH ELECTRONIC MAIL

CROSS REFERENCE TO RELATED APPLICATION

This application claims priority to provisional application for patent Ser. No. 60/724,118, filed Oct. 6, 2005, which is incorporated herein by reference in its entirety and for all purposes.

BACKGROUND OF THE INVENTION

The invention is a system, method and software program for automatically extracting content for integration with electronic mail. Depending on the needs of the user, the invention may be implemented by installing the Wrapmail application on a server located on an internal network, having a third party host the Wrapmail application on a server located on an external network, or by accessing the Wrapmail application on the Internet where it may be embodied as a web application.

The Internet has become the dominant medium for communicating, distributing and publishing ideas. Commercial use is also widespread. A company may use the Internet to offer services, sell products, provide support and advertise on a global scale. Today, many successful companies use the Internet as the primary medium for conducting business. To draw visitors or potential customers, websites are designed with rich images, logos, and other media. Although the interconnectivity of the Internet makes publication and distribution of website content to a very broad audience easy, communicating the same content directly with potential customers on a personal level remains difficult.

Using a website to communicate with the market is critical to a company's success. The website provides a place where customers can read about and see the products offered. Most companies expend a great deal of money to build their website, to promote products as well as build identifiable brands. Thus, integration of brand identity in a company's Internet presence is an important component of the company's overall marketing strategy. The passive nature of websites, requiring users to point their browsers to the URL of a company's home page, makes it difficult for a company to insure that all of their customers are informed about their sales and promotions.

Websites may be composed with a combination of technologies. HyperText Markup Language (HTML) is a markup language designed for the creation of web pages with hypertext and other information. HTML is used to structure information—denoting certain text as headings, paragraphs, lists, the placement of images and so on—and can be used to describe, to some degree, the appearance and semantics of a document. While some e-mail clients allow a sender to compose e-mail with HTML, learning HTML and creating HTML e-mail templates requires a serious investment on the part of the sender.

To address the passive nature of websites, many companies use RSS feeds. RSS is a simple XML-based system that allows users to subscribe to their favorite websites. By using RSS, a webmaster can put their content into a standardized format, which can be viewed and organized through RSS-aware software, usually an aggregator. While RSS may assist syndicating the text in a website, it has not succeeded in syndicating rich multimedia. In addition, RSS requires a person to subscribe in order to receive the syndicated information. While this may partially solve a problem with one-to-many communications; it does not solve the person-to-person communication issue.

Electronic mail is the medium of choice for communicating information from one person to another. Today, people generally send e-mail with two similar technologies. They may use an e-mail client, which is an application residing on the hard drive of the computer. An e-mail client, also called a mail user agent (MUA), is a computer program that is used to read and send e-mail. Popular e-mail clients include Outlook, Eudora, Thunderbird and Apple Mail.

The second option is webmail. Webmail is an application residing on a remote server on the Internet. This web application allows users to access their e-mail through a web browser. Popular webmail providers include Hotmail, Yahoo! and Gmail. Other webmail providers include AIM Mail, Mail.com, Fastmail, Lycos Mail and Excite Mail. It is also possible to run webmail software on one's own web server. Commercial webmail software solutions such as Outlook Web Access (OWA) are also available. In addition, some cellular phones may provide limited e-mail functionality.

While most e-mail applications allow a user to format their e-mails with HTML tags, it is not easy to distribute content as rich as the content on a website. E-mail clients require the installation of a piece of software on every user's computer. Webmail services do not allow a user to easily edit mails they are working on offline. Commercial webmail services often offer only limited e-mail storage space and either display advertisements during use or append them to e-mails sent. Unlike an e-mail client user, the webmail user cannot access their e-mail from his or her local hard drive.

In a typical computer network system such as a local-area network (LAN), wide-area network (WAN), and the Internet and the World Wide Web (WWW), e-mail applications are often utilized to compose and transmit written and graphical communications between two or more users of the network. Each user has a unique network address that may be used for routing and identifying purposes in delivering an e-mail from one user (sender) to another user (recipient). E-mail is typically sent by an e-mail client such as Microsoft Outlook and received by a server for processing outbound and inbound e-mail, such as a SMTP server, POP3/IMAP server, or another server in communication with the SMTP server, POP3/IMAP server, or both.

Most e-mails are relatively brief, containing only a small amount of text. For larger e-mails, an attachment feature of the e-mail application may be used, whereby the larger document is electronically transmitted by attachment, thus preserving the original formatting of the document. With attachments, ordinarily, no formatting is lost. Yet, attachments require the recipient to open the attachment in order to convey the intended message. Furthermore, these attachments are often used as a medium to send a computer virus to other computers. Highly targeted and personalized e-mail sent with rich dynamic content presents a new opportunity for companies to brand and promote their business online.

Communication via the Internet and WWW is a staple of business correspondence, advertising and promotion, as well as sales. A company website, usually accessible through a URL to a designated "home page", provides an electronic gateway to company information, products and services. Most companies expend a great deal of money and time to build their websites, to promote the desired image as well as build identifiable brands. Integration of brand identity in a company's web presence is an important component of the company's overall marketing strategy.

At present, most websites are composed in one or more hyper text markup language (HTML) formats, (or eXtensible markup language (XML) format), which allow the inclusion of text and graphics, including scanned images, in web pages. The functionality of HTML formats allows companies to build sophisticated websites incorporating their brands, trade and service marks, and one or more themes that enhance and distinguish the company's image.

Repeated, uniform use of a company's trade and service marks builds goodwill in the brand (the source of the goods and services), and can be an important asset to the company. To enhance brand value and distinguish a company's products and services from those of its competition, a company's marketing departments, often with the supervision of the trademark design and creation and legal protection personnel, oversee the production and quality control of business cards, letterhead, invoices, labels, packaging, signage, and web pages. Consistency and uniformity are critical in establishing and maintaining a strong brand.

E-mail has long been underutilized as a tool for consistent use of a company's branding components and trademarks. Although most e-mail applications allow composition and display of HTML formats, it is not practical to custom-design HTML e-mail formats with scanned inputs and graphical images, as this would defeat the time-efficient use of e-mail. A further problem is that such design would necessarily be stored locally.

An attempt to address such deficiencies is found in the invention of U.S. Pat. No. 6,446,115 to Powers. Powers discloses a system and method for generation, graphical composition, and delivery (or routing for delivery) of conventional forms of written correspondence, with security against forgery. The method of Powers requires extra steps for each user to employ the system. There is no enforced uniformity of messages, and no suggestion of extracting the company's web site content to wrap an e-mail message.

Other attempts to address this problem require a significant change to the software and hardware framework. For example, in United States Patent Application, Pub. No. US 2005/0027781 A1, published on Feb. 3, 2005 to Curry et al., the application requires the tight integration of the e-mail formatter program with post-office properties of the mail server to format outgoing messages. Most importantly, Curry et al. requires every employee to install new e-mail client software forcing end users to switch from their current clients and learn a new one.

The transaction costs involved with switching software, especially with an application as critical as e-mail, should raise many concerns. First, the user must learn an entirely new interface. Second, importing and exporting contacts in an address book may cause problems. Third, many e-mail applications have built-in calendars that users rely on significantly. Here, the invention removes those constraints with options that include internal hosting, as well as external hosting of the SMTP server. In addition, the present invention teaches a pure web based version of the application. Curry et al. teaches away from an implementation involving external hosting, and provides no suggestion of a pure back end solution, and no suggestion of dynamically extracting content from various sources to leverage investment in a website.

BRIEF SUMMARY OF THE INVENTION

The present invention is comprised of a system, method and software to facilitate the process of dynamically extracting content from a website or other data source for integration with an e-mail. E-mails may be wrapped with a template based on an arrangement of HTML frames and then reformatted for distribution to its originally intended recipients. This may be accomplished without installing software on a local network or computer, and without impairing the functionality of the resident e-mail application.

The template may form a border, although any arrangement of frames is possible, about the e-mail message. A few examples of these template arrangements include a header frame, a footer frame, a left hand column frame or a right hand column frame. To be clear, any combination or arrangement of frames is possible. The invention simply wraps the e-mail received and sends out the wrapped e-mail to a designated recipient.

The Wrapmail Technology Suite (WTS) may be implemented for standard e-mail clients as well as a webmail client. Although other uses may develop, there are three general uses for the technology: 1) corporate e-mail; 2) basic private e-mail; and 3) premium private e-mail. All three uses are based on the technological core that is responsible for receiving the e-mail, separating the e-mail header from the e-mail message body or payload, selecting a template, populating the template with content, re-assembling the e-mail with the associated template and sending the result to a recipient.

In addition to the above, WTS may provide auxiliary mechanisms for reporting, managing templates, processing conditions management and other tools containing various functionality. For example, the WTS can allow a licensor company to easily and effectively control the use of its marks by one or more licensees, by requiring use of the WTS with a designated "wrap" that would insure compliance with quality control and licensing terms. In one embodiment, the invention solves the above noted problems by dynamically extracting content from a website to populate a template and formatting the e-mail with the dynamically populated template. This exploits the power of an e-mail application as a business correspondence tool and, at the same time, leverages the investment in a website.

Other objects and advantages will be more fully apparent from the following disclosure, including the drawings and appended claims.

BRIEF DESCRIPTION OF THE DRAWINGS

The above-mentioned and other features and objects of this invention and the manner of obtaining them will become apparent and the invention itself will be best understood by reference to the following description of an embodiment of the invention taken in conjunction with the accompanying drawings, wherein:

FIG. 6 is a block diagram of what an e-mail header may consist of;

DETAILED DESCRIPTION

Figure 1:
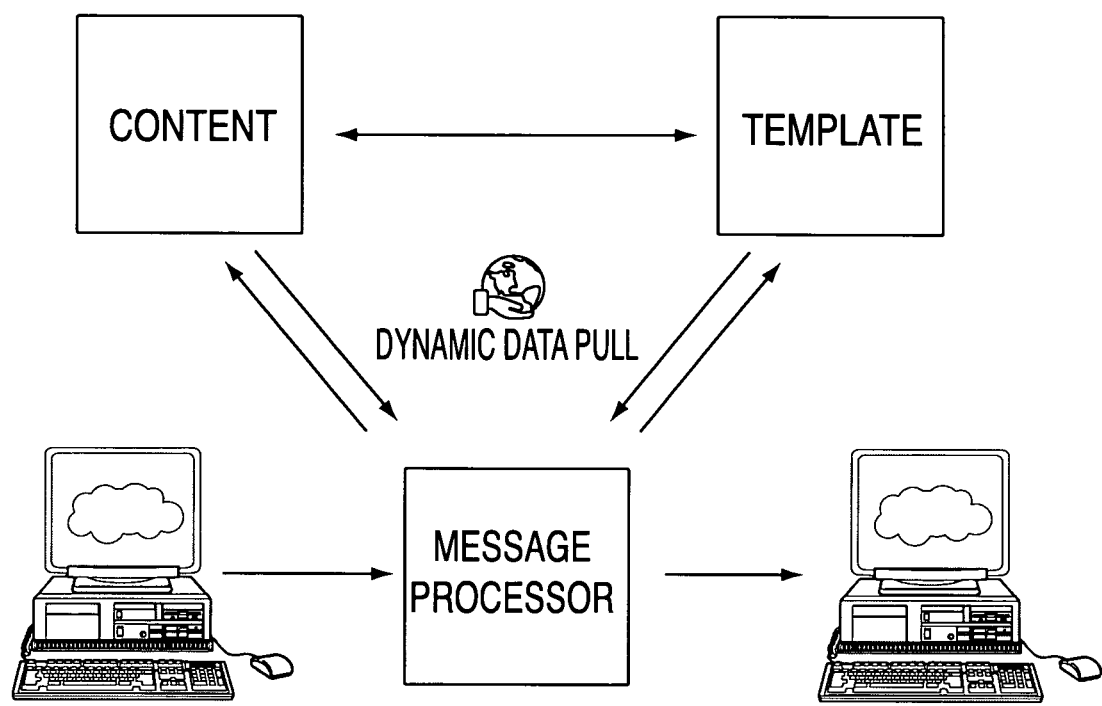
FIG. 1 is a high level overview of the system.

In this specification, the following terms are used as defined here. Content means digital video audio, image, URL(s) or animation file(s). Content may be stored on a website, in a database or other data source. A template may be a predefined arrangement of frames or can be automatically generated by a server side script. One possible arrangement of frames is the border layout, but many arrangements are possible. While frames are preferred, other encapsulating data structures may be used. Here, each frame displays a different HTML document. If a content item is added or changed, the template does not need to be changed, whereas a non-frameset template would have to be edited if a content item is added or changed. The template or set of templates may be stored on a website, in a database or other data source. Neither the content nor the template require being on the same server as the Wrapmail application.

A server is a computer system that provides services to other computing systems—called clients—over a network. One preferred server is a Dell Poweredge Server with a 2.8 GHz processor, 2 MB Cache, a 800 MHz Front Side Bus, 2 GB DDR2 400 MHz of RAM, two 73 GB SCSI hard drives with dual onboard NICS, running Windows Server 2003. An internal network may be a computer network embodied as a LAN, WAN or peer-to-peer network. A local area network (LAN) is a communications network covering a local area, like a home, office, or group of buildings. A wide area network (WAN) is a computer network covering a broad geographical area. A peer-to-peer (P2P) computer network is a network that relies primarily on the computing power and bandwidth of the participants in the network rather than concentrating it in a relatively low number of servers.

Outbound e-mail generally follows, SMTP or Simple Mail Transfer Protocol, the de facto standard for e-mail transmissions across the Internet. Inbound e-mail may follow POP3 or Post Office Protocol version 3, an application-layer Internet standard protocol, to retrieve e-mail from a remote server over a TCP/IP connection. A preferred scope of work for the installation process consists of the following steps: 1) evaluation of the platform components to determine that the hardware and software platform meets all internal third party equipment policies; 2) determination of the platform network configuration, where the user company would supply the network configuration parameters for the platform; and 3) determination of the platform installation location. The user company would determine the physical location for any co-located equipment. Installation of the platform on-site is the preferred implementation.

In this preferred implementation of the service, the invention is implemented as a set of software components residing on the server. The Wrapmail application performs the following functions: 1) receive e-mail traffic; 2) wrapping of received e-mail to an HTML formatted e-mail; and 3) further distribution of the wrapped e-mail. Preferably, all of the activities performed by the Wrapmail application are logged into MySQL database residing on the server as well. Alternatively, logging can be performed to any ODBC compliant database engine.

The Wrapmail Message Processor is the name given to the core technology of the Wrapmail application. The Message Processor receives an e-mail, separates the message body from the header, selects a template, reassembles the original e-mail and sends the e-mail to a recipient or recipients. It is preferred to receive the e-mails in RAW/MIME format. RAW refers to a raw image file format, an image format containing minimally processed data from the image sensor of a digital camera or image scanner. Raw files are so named because they are not yet processed and ready to use with an image editor or displayed by a web browser or any tool capable of reading HTML. MIME (Multipurpose Internet Mail Extensions) is an Internet Standard that extends the format of e-mail to support text in character sets other than US-ASCII, non-text attachments, multi-part message bodies, and header information in non-ASCII character sets. Virtually all human-written Internet e-mail and a fairly large proportion of automated e-mail use SMTP in MIME format.

FIG. 1 is a high level overview of the system. A person sends an e-mail which is received by the Message Processor where it is processed and wrapped with the appropriate template. The template is generally composed of frames and populated with content. Although static pre-filled versions are available, the template may be dynamically populated with content from a website, database or other data source. After the Message Processor reassembles the e-mail, the wrapped e-mail is sent to a recipient.

Figure 2A:
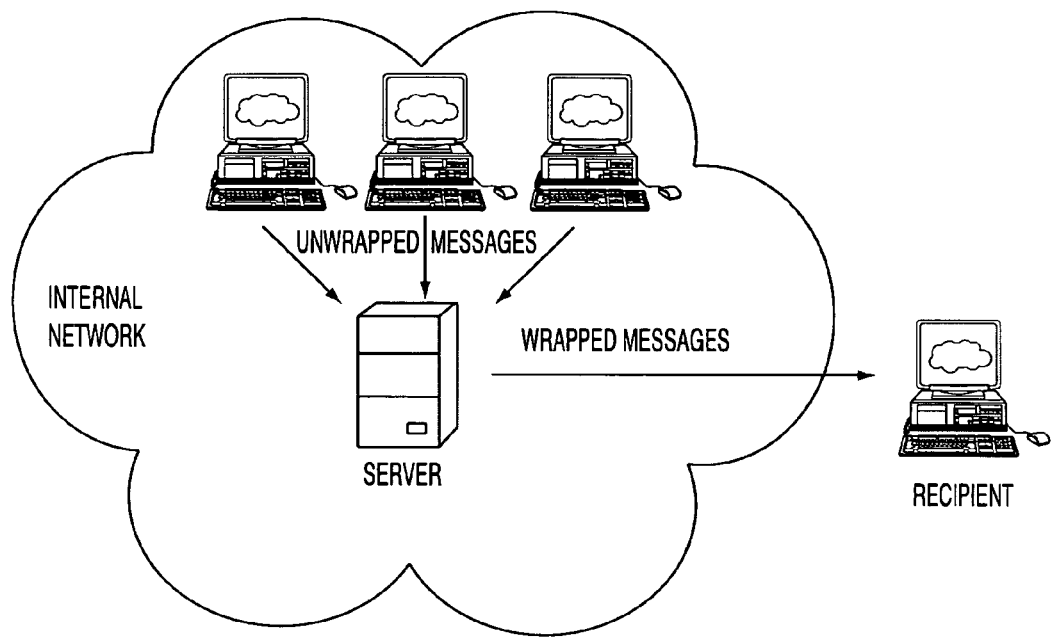
FIG. 2A is a network diagram of the invention implemented on a server in an internal network.
Figure 2B:
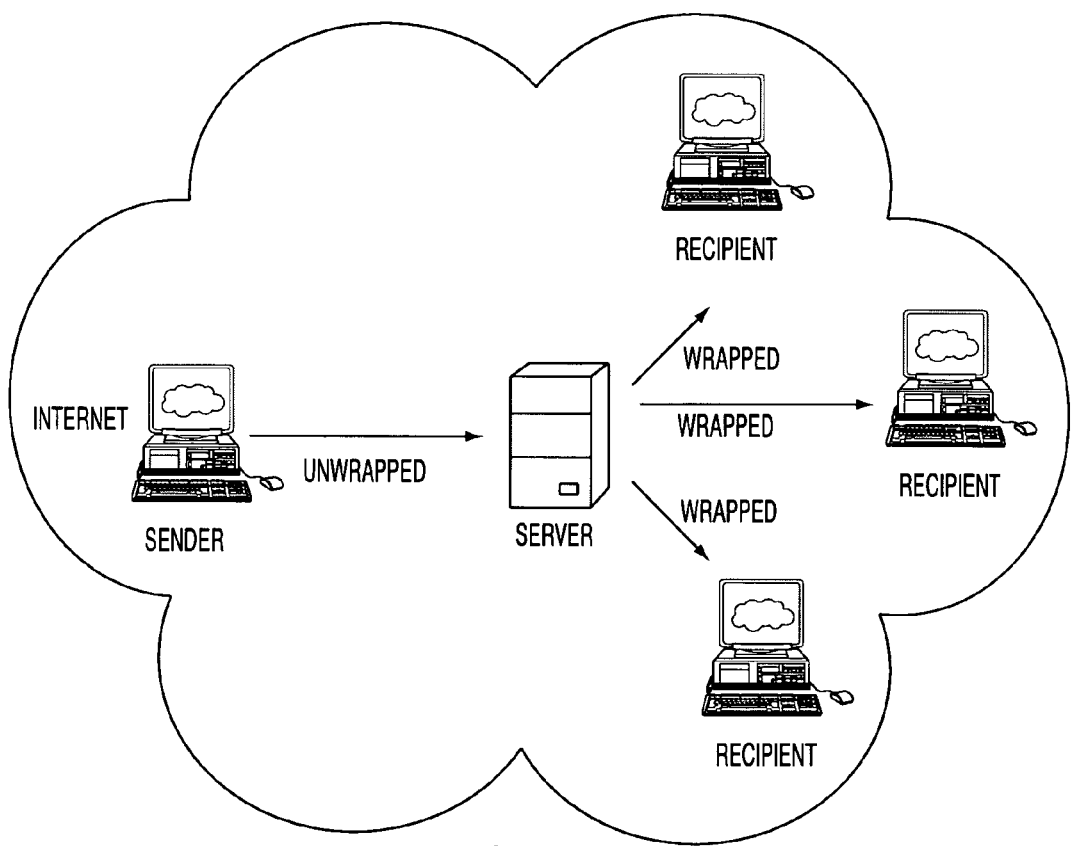
FIG. 2B is a network diagram of the invention implemented on a server in an external network or as a hosted solution.

Turning to FIGS. 2A and 2B, the system may be installed on an internal or external network. For the internal network, it is not necessary to install a hardware component although a server dedicated for wrapping e-mail, the WrapServer, may be installed. For a high volume of wrapped e-mails, it is the preferred embodiment to install the Wrapmail application on a server in a data center, if available. A data center is a facility used for housing a large amount of electronic equipment, typically computers and communications equipment. It can occupy one room of a building, one or more floors, or the whole building. Most of the equipment is often in the form of server racks or blades, which are usually placed in single rows forming corridors between them.

Turning to FIG. 2B, an embodiment with the Wrapmail application installed on an server residing on an external network is shown. Here, the profile in an e-mail client is edited to point to an SMTP server hosted somewhere on the Internet. For the front end, this one time change is all that is necessary for the Wrapmail application to function properly.

There are many different ways to ensure the Message Processor receives an e-mail for wrapping. One method for receiving an e-mail includes SmartHost forwarding. SmartHost forwarding may require some background configuration, but it does not have to. For example, an e-mail client may be configured to send e-mail to a designated server rather than resolving the addresses and performing final delivery. SmartHost forwarding may also forward e-mails from a user's e-mail server to a co-located WrapServer. There are numerous different ways to ensure an e-mail is forwarded to the correct place. Those permutations are well known to those skilled in the art.

Figure 3:
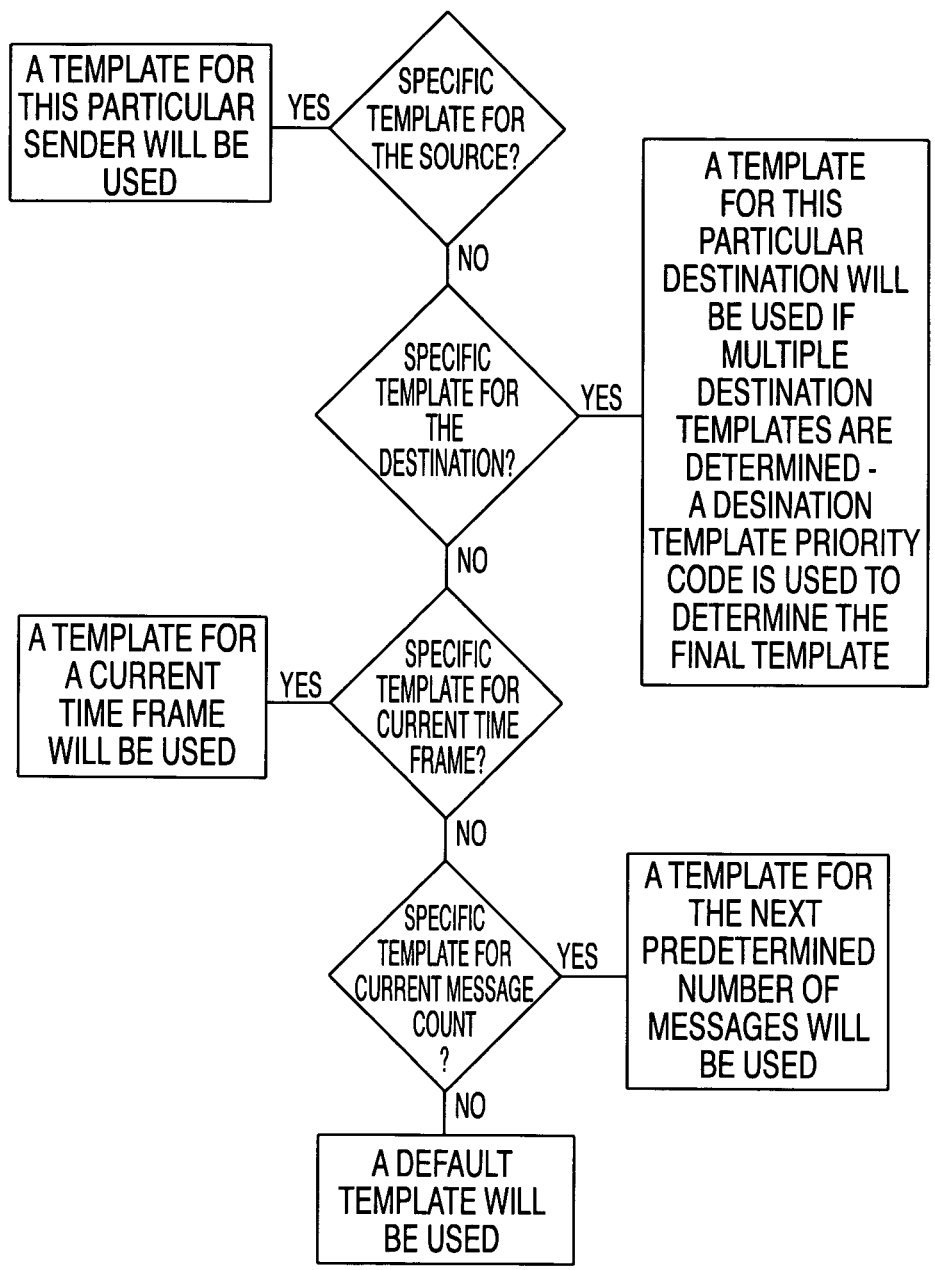
FIG. 3 is a decision tree showing the steps for selecting a template.

Turning to FIG. 3, the block diagram shows the decision-making process of selecting a template as performed by the Message Processor. If an e-mail is internal, by default internal e-mails are not wrapped, it is processed differently than the external. Depending on how the Message Processor is configured, an internal e-mail may be: 1) passed directly to an SMTP server as is, without any wrapping, or 2) processed according to a default template, or 3) processed according to another internal template.

The processing of an external e-mail may depend on a number of different factors, although at least one factor is necessary to determine how an external e-mail is processed. Those factors may include where the e-mail is coming from (i.e. domain, sender or device), where the e-mail is going (i.e. domain, recipient or other destination), an e-mail counter, or a time frame. It should be noted that these factors may be excluded and other factors may be included, the order of steps for selecting a template may be changed and priorities to a set of factors may be assigned in different ways. The following is one example of the many ways to select a template.

The first factor is to determine where the e-mail is coming from. An e-mail can be identified as coming from a domain, a sender having an e-mail address, a mobile device or some other source. There exist two primary modules for selecting a template based on the sender; a List Based Module (LBM) and a Domain Substitution Module (DSM). Regardless of which module is applied, an e-mail coming from the same domain may be wrapped differently. For example, automobile dealerships may want to wrap a salesperson's e-mails with a wrap filled with content of a particular automobile make or manufacturer.

The LBM module uses a list to associate specific e-mail addresses with a template. The list may be populated directly or it may be stored as a file or folder, maintained on a regular basis. The LBM module is programmed to periodically synchronize with the file. An example of such an alternative source is Microsoft Windows Active Directory where each user is assigned to a certain organization and that field is maintained by a company's IT Department as the users move from one organization to another. In this case the template module will access the Active Directory on a periodic basis and would synchronize the information from it with its internal list. If the LBM module is implemented, there are no actions that need to be taken by individual employees to choose the template.

The DSM module provides the sender more control in template selection. This module is particularly suited for senders who may require more than one template. In addition, the DSM module works particularly well for smaller organizations that do not have a central organization management mechanism in place. For the DSM module to work, a sender changes their e-mail client profile to reflect an e-mail address stored on a file maintained by the message processor. For a example, the sender's e-mail may be modified from user@realdomain.com to user@nonexistingdomain1122.com in an e-mail client's profile or account. The message processor maintains record of nonexistingdomain1122.com. The message processor not only wraps the message from nonexistingdomain1122.com into an appropriate template but also replaces the domain in the e-mail's FROM field to the correct one (realdomain.com) thus allowing proper flow of replies. To select a template, the sender merely selects a profile to send the e-mail from their email client.

As shown in FIG. 3, there are several other factors that are taken into account in determining which template to apply. A template may be selected based on where it is going (i.e the domain, recipient e-mail address or other destination), a time frame or an e-mail counter. Dynamic portions of a template, discussed in more detail below, may be updated by an internal database, external database, or RSS/Atom feed. The Wrapmail application also maintains a file to keep track of an exclusion list for those who do not want to send or receive wrapped e-mail.

In selecting a template, the Message Processor asks whether there is a default template associated with the source or sender. As noted earlier, either the whole e-mail address or just the domain portion of the address may be used to determine which template the Message Processor will wrap the e-mail with. If the answer is no, the next decision is whether there is a specific template for the recipient or destination. If the answer is yes, then a template for the particular recipient is selected. If multiple destination templates are discerned, a destination template priority code may be used to determine a final template. If the answer is no, then the next decision is whether there is a specific template for the then-current time frame. If the answer is yes, then the template for the then-current time frame is selected. If the answer is no, then the Message Processor proceeds to the next decision of whether there is a specific template for the then-current e-mail count. If the answer is yes, then a template for the next pre-determined number of e-mails will be selected. If the answer is no, then a default template will be selected.

Figure 4:
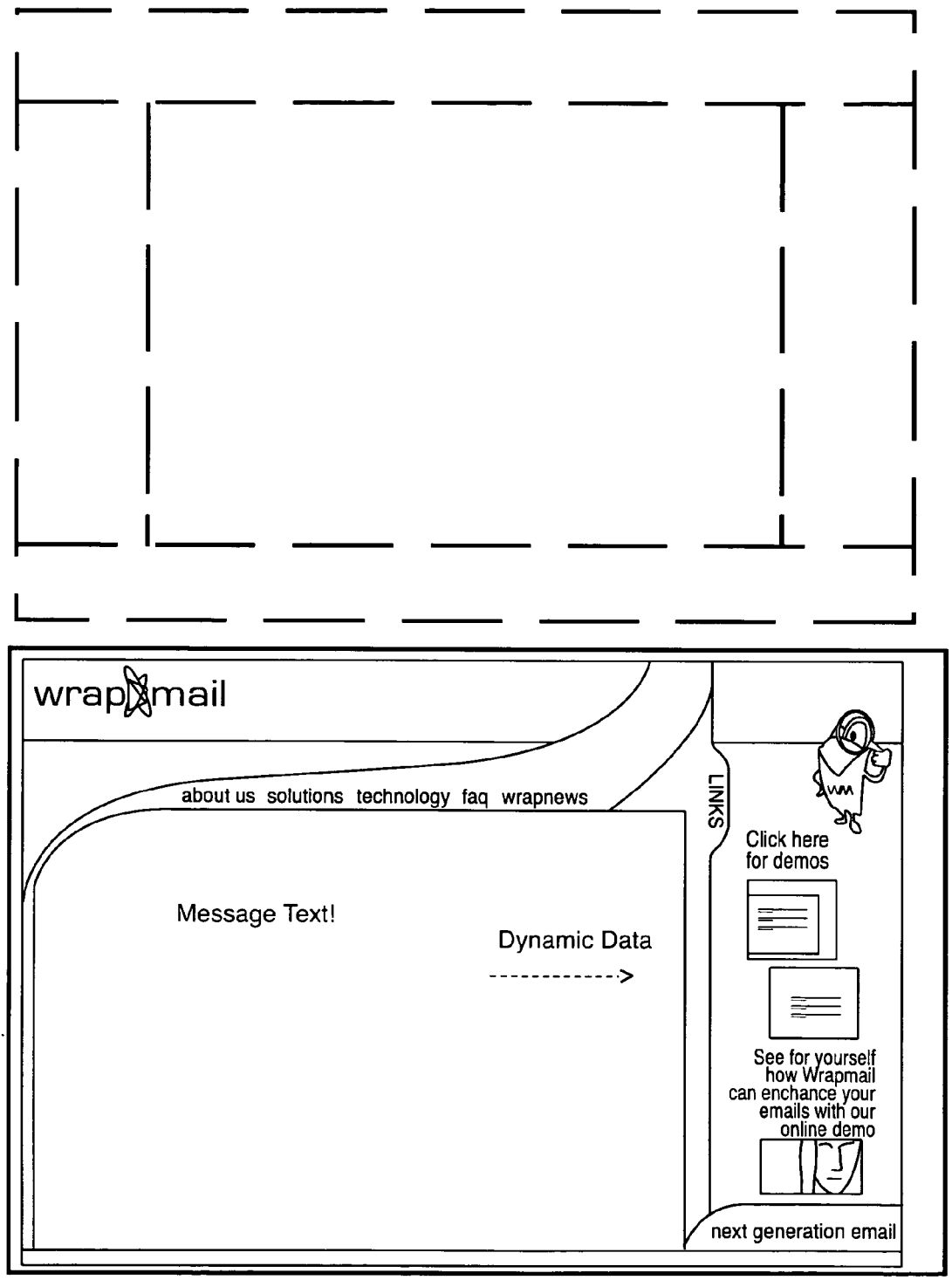
FIG. 4 is one arrangement of the frames in a template wherein the frames form a border around the email.

Turning to FIG. 4, one of the key benefits of the Wrapmail application is the ability to dynamically populate a template by extracting content and branding material from a website for integration with an e-mail. The preferred form of wrapped e-mail is the border frame, illustrated in FIG. 4. Here, the content of the website is used to form a border about the actual text of the message body or other material from the original e-mail, making a customized e-mail wrap suitable for use within and without an organization.

Uniformity and consistency are guaranteed. This makes it very easy for a company to leverage the investment in its website, controlling the content of its outgoing messages to conform to proper brand and trademark usage. In addition, the dynamic population means that the Wrapmail application does not require the company to maintain more than one data source for content. The data source may be automatically updated when new content items are added or changed to the website. This is particularly useful for real estate agents, car salesmen, restaurants, and electronics stores where images of the inventory on the website constantly change.

Figure 5:
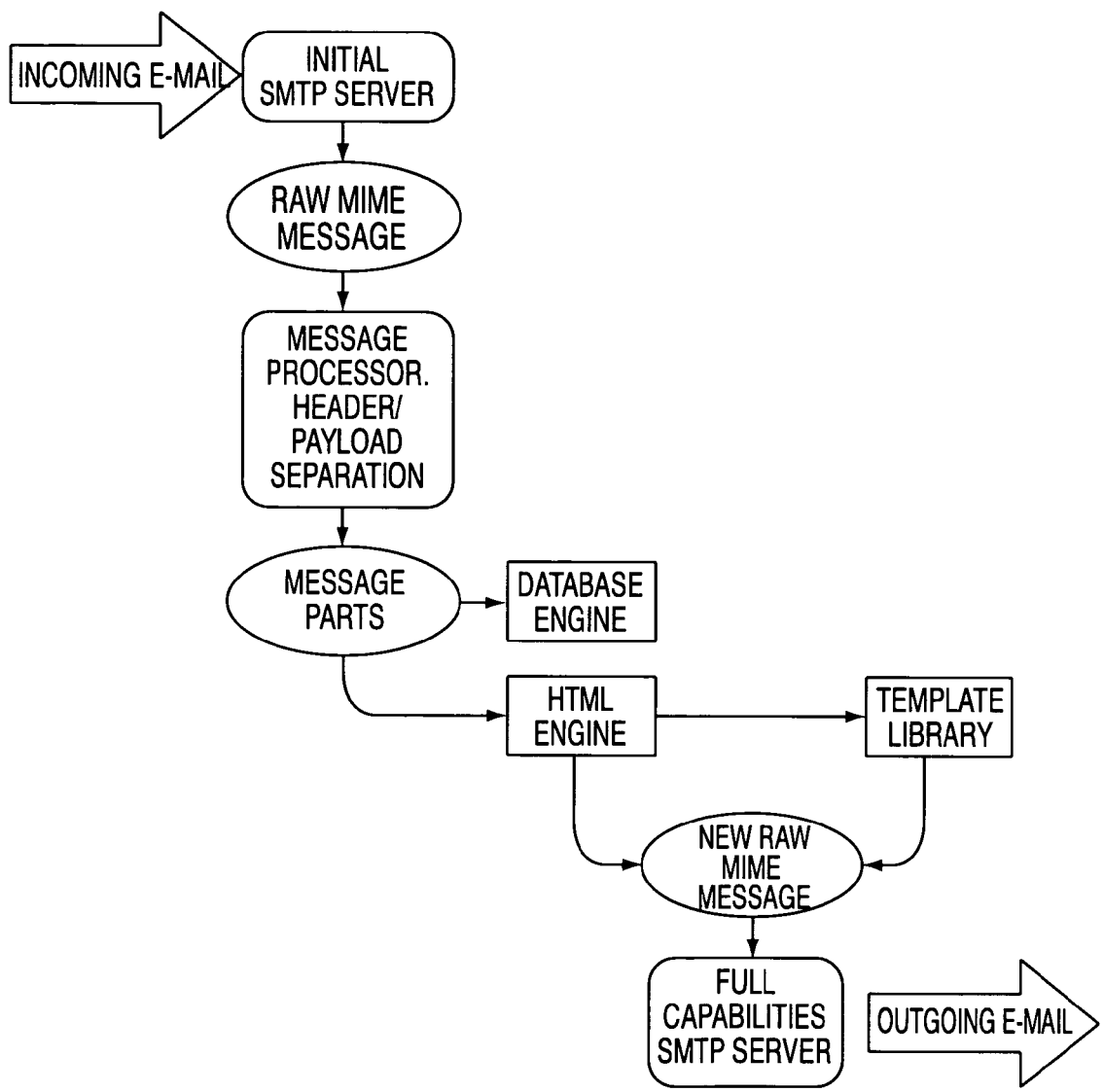
FIG. 5 is a flow chart of the general data flow in the message processor.

Turning to FIG. 5, there is a flow chart illustrating the general data flow during the core processes of the Wrapmail Application, controlled by the Message Processor. In order for the Message Processor to begin wrapping e-mail, the Wrapmail application receives the e-mail and saves it to a storage device or volatile computer memory for processing. Each e-mail may be uniquely identified by the information contained in the TO field of the e-mail header. The Message Processor separates each addressing section of the header, the TO and CC fields. By comparing the full list of recipients with those in TO and CC fields, the BCC (blind copy) field may be populated. Overall, the following attributes and parts may be separated from the e-mail:

TABLE 1

List of extracted attributes

| Attribute | Description |
|---|---|
| FROM | Originator of the e-mail |
| SRC RECV | Last known RECEIVED statement of the e-mail. Contains the source public IP of the originator |
| TO | List of primary recipients of the e-mail |
| CC | List of carbon copy recipients of the e-mail |
| BCC | calculated list of blind carbon copy recipients |
| SUBJECT | Subject of the e-mail |
| TEXT | 7-bit text portion of the e-mail (if present) |
| HTML | HTML portion of the e-mail (if present) |
| ATTACHMENTS | Collection of files attached to the e-mail (if present) |
| IN-LINE OBJECTS | Collection of embedded objects in the HTML portion of the e-mail. Typically, embedded images |

In another embodiment, the Message Processor may enter the list of recipients, subject and timestamp and other information in a database for reporting, logging and tracking purposes.

When the source and recipient(s) of the e-mail are determined, an external/internal decision may be made. If the domain portion of every recipient of the e-mail matches the domain portion of the e-mail source, the e-mail is considered internal. If any of the recipient's domain portions do not match the source domain, the e-mail is considered external. As noted above, sometimes wrapping an e-mail is not necessary.

Once it has been determined that wrapping of the e-mail is required, the Message Processor selects the proper template for wrapping the e-mail. While static templates with pre-filled content may be used, the dynamic population of a template with content is one of the unique benefits of the Wrapmail application. The content may come from a website, a database or other data source. Dynamic population may be accomplished in a number of ways. A template may be embodied as an HTML file embedded with server side scripts. These scripts may direct the Message Processor to check with certain sources in generating a populated template as a dynamic file. Depending on the hardware platform, an ASP or PHP script may be used to generate a populated template.

Dynamic population may be also be accomplished on a scheduled or a triggered basis. A content set may be assigned an expiration time stamp and will be used during the scheduled time. In addition, dynamic population may be triggered by a syndication event such as receiving an RSS or Atom feed. Dynamic population is available for either server configuration, external and internal. A user of the web based version of the Wrapmail application may direct the application to populate dynamically as well. The interface of the web based version allows the user to disable and enable dynamic population, set the schedule and update the source for the data.

After the selected template is populated, the Message Processor determines whether the message was previously processed by the system. This ensures the removal of previously embedded images and prevents the e-mail from growing in size as well as for aesthetic reasons. To make this determination, the Message Processor examines the HTML attribute for the presence of hyperlinks pointing to the system's click tracking engine, a component of the Wrapmail application. While the click tracking engine may be located anywhere, a preferred location of the click-tracking engine is: http://track.wrapmail.com/clicktrack/track.asp. If it is determined that the message was previously processed, the Message Processor converts the HTML portion (if present) to plain text. Furthermore, at the point of reassembly, the converted content is searched for the presence of the e-mail exchange threading information to represent the e-mail thread properly.

Figure 6:
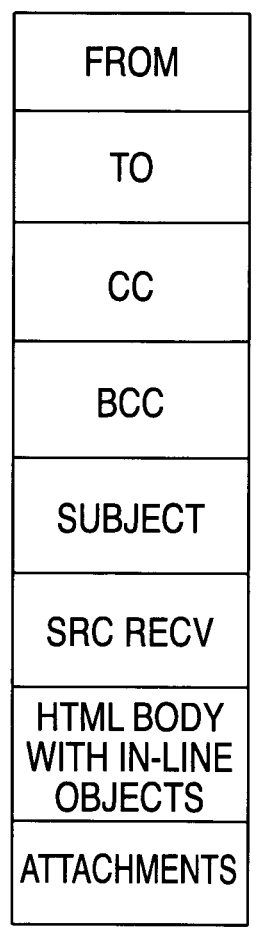

Lastly, the Message Processor creates a new RAW/MIME e-mail and reattaches the header. Although other formats or standards may be used, RAW and MIME are preferred because the standards are minimal in complexity and the most widely adopted. The new e-mail header is populated with FROM, TO, CC, BCC, Subject and SRC RECV information from the original e-mail, as shown in FIG. 6. Also shown in FIG. 6 are the HTML body with in-line objects and any attachments that were attached to the original message. Combining these attributes is the most complicated part of the message reassembly. To accomplish this, several server side scripts are written to generate HTML pages based on a variable URL. Once all the attributes of the e-mail have been re-assembled, the original attachments (if any) are concatenated. At this point the Message Processor transmits the new wrapped e-mail to an outbound SMTP server for final outbound delivery.

Figure 7:
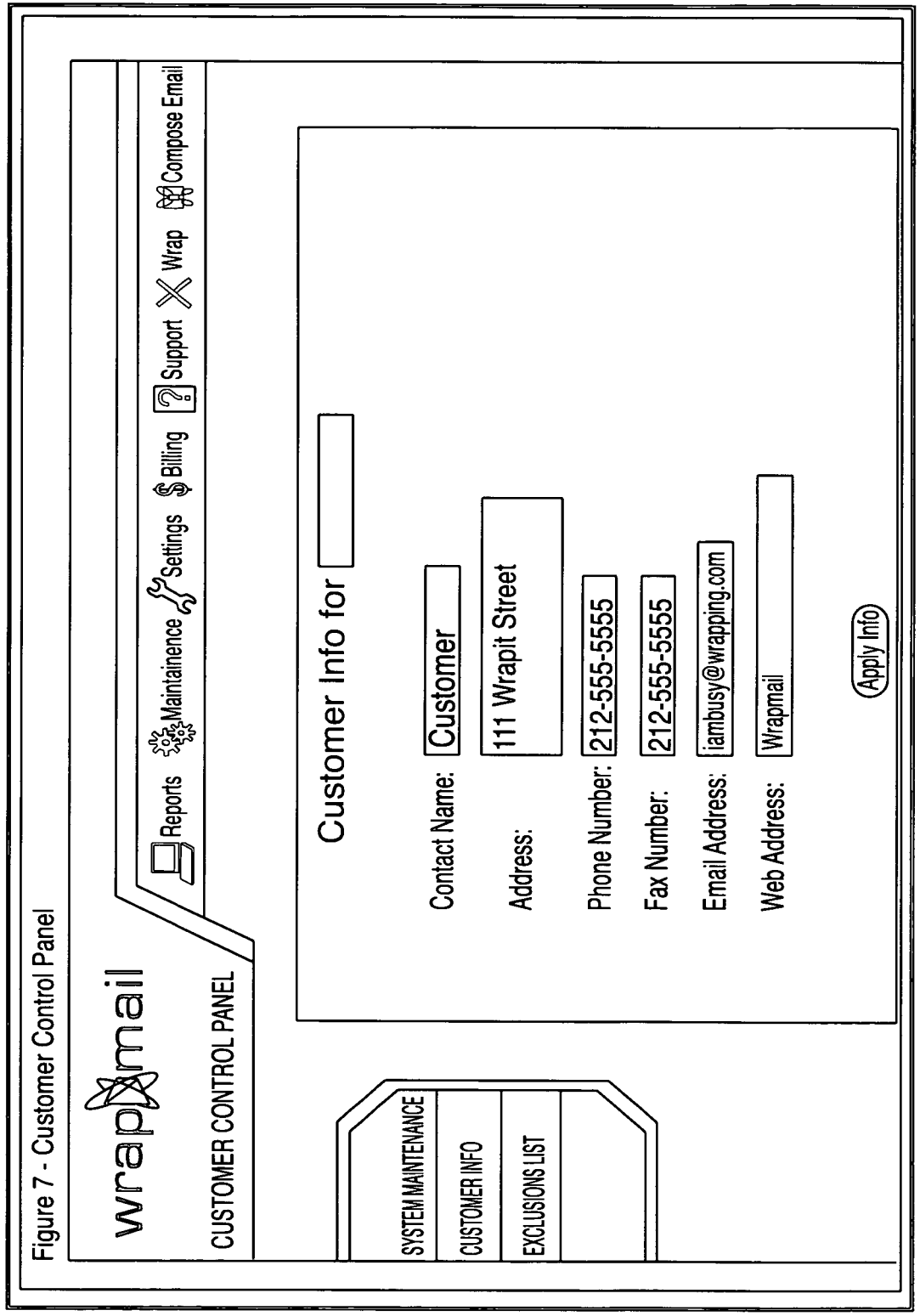
FIG. 7 is a diagram of the reporting module of the invention.

Turning now to FIG. 7, there is shown Wrapmail embodied as a web application. In the web application, anybody on the Internet may create an account. Once an account is established, the sender will receive a login and may begin to create and manage templates.

The web application may consist of a user interface for composing e-mails, a database, and a template manager. The web application will provide the same or similar functionality of a typical webmail client. Templates may be created using an online tool that allows the user to define the graphical areas and hyperlinks. The tool may also provide a way to upload and validate images that are used to populate a template. The user may also assign hyperlinks to rectangular "hot spots" within an image. Again, the template creation tool validates the "hot spots" positioning to assure that no overlapping will occur when a recipient reads the e-mail.

In the web based embodiment, the Wrapmail application may reserve a certain portion of the template for its own use. In the template preview mode, the Wrapmail application marks out the reserved area. Other service providers may reserve this area for their own dynamic content or they may lease this area to third parties. A user may also pay a premium to keep the application from reserving any portion of the template.

Each user is offered two principal ways of accessing their webmail. Preferably, each account has full POP3/SMTP implementation as well as web based access. Web based access provides standard webmail functionality. As an add-on feature, a user may establish an account with the system for an existing e-mail address from another domain. If so, the user is given a choice of either using his existing e-mail client as a means of sending the messages or will have a way of securely sending his/her existing e-mail login information to the provider.

As shown in FIG. 7, the Wrapmail application may provide a suite of tools to assist with administration. This suite of tools is available for the installed, hosted and web versions of the Wrapmail application. Using these tools, a user can make changes in the template, associate templates with various rules, make payments for the service and view various reports. The preferred tool set may include a payment tool, an account settings tool for making adjustments to control the Message Processor, and a reporting tool that allows the user to see various historical transactions.

Figure 8:
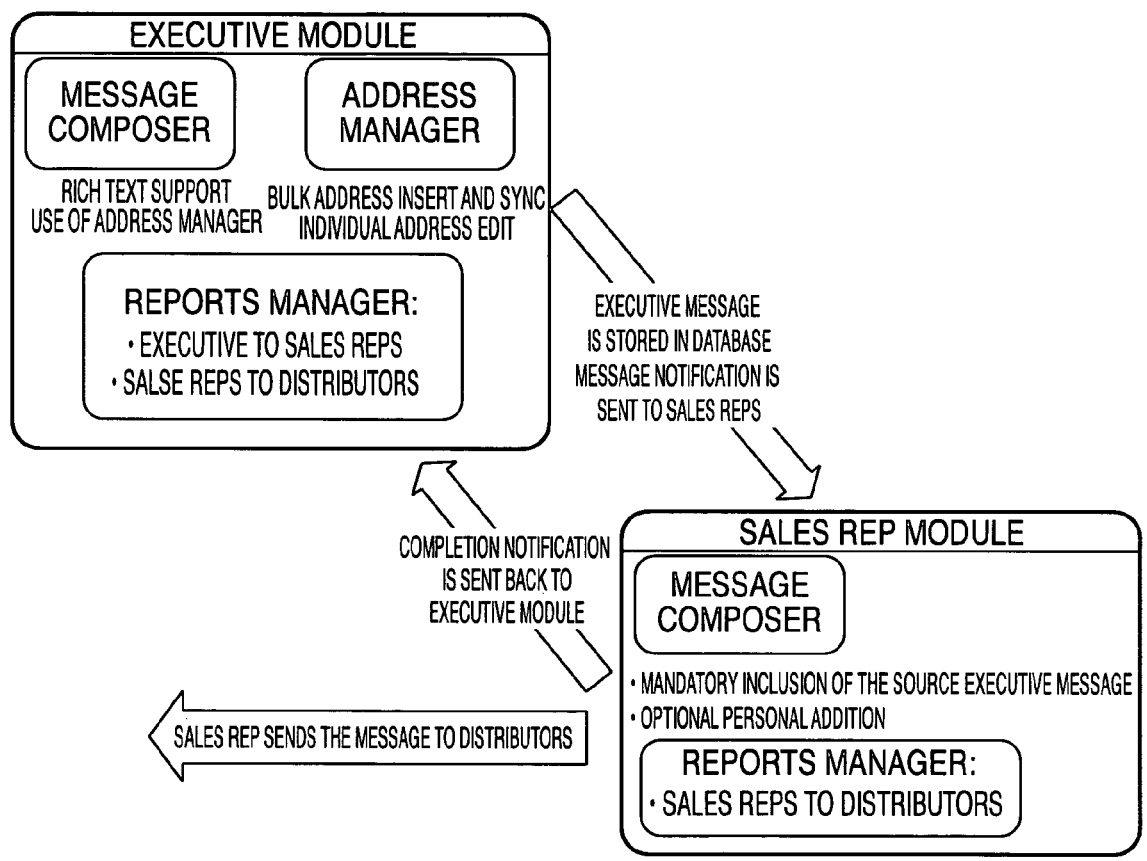
FIG. 8 illustrates the user interface, a customer control panel (CCP), of the invention.

Turning to FIG. 8, there is shown an embodiment of the vertical e-mail communication system for reporting. Here, an executive module has a message composer, preferably with rich text (files with the suffix .rtf) support and the use of an Address Manager. The Address Manager allows bulk address insert and synchronization and individual address edit. The Executive Module also contains a Reports Manager allowing reports from the executive to the sales representatives, and from the sales representatives to the distributors. The Executive Module is in communication with the Sales Rep Module which also has a message composer, with mandatory inclusion of the source Executive Message and optional personal additions. The Reports Manager for the Sales Rep Module has the capacity to output sales reports to distributors. The Executive and Sales Rep Modules communicate with one another. The original executive message is stored in a database, and a message notification is sent to the Sales Rep Module(s). Upon transmission from the Sales Rep Module to the distributor, a completion notification is sent back from the Sale Rep Module to the Executive Module.

Figure 9:
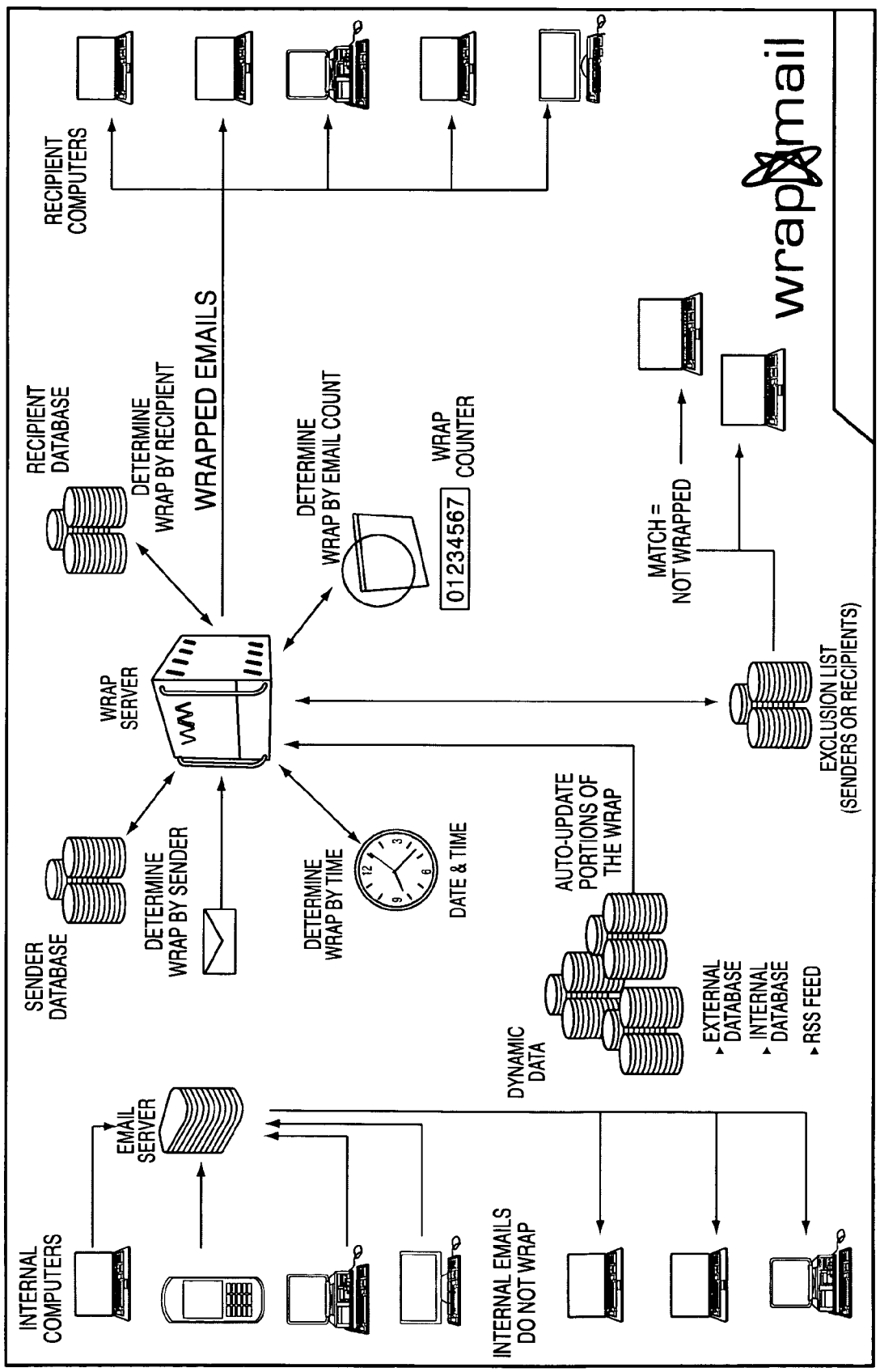
FIG. 9 is a network neutral overview of the WTS.

Turning to FIG. 9, there is shown a network neutral overview of the Wrapmail system. Here, any number of devices may communicate with their own e-mail servers to wrap e-mail. Internal e-mails are, by default, unwrapped. E-mails designated for wrapping may be sent to a WrapServer, where most of the processing is performed. The WrapServer selects a template and populates the template with content. An exclusion list is checked and the Wrapmail application sends a wrapped e-mail to a recipient. In order to implement the Wrapmail application, one may install a hardware component called the WrapServer on the premises where the e-mail server is located. WrapServer will receive an e-mail, select a template, dynamically populate that template with content, apply the template to the e-mail, and send the e-mail to a recipient.

Since other modifications or changes will be apparent to those skilled in the art, there have been described above the principles of this invention in connection with specific apparatus, it is to be clearly understood that this description is made only by way of example and not as a limitation to the scope of the invention.

What is claimed is:

1. A method of wrapping e-mail, comprising the steps of:
    smarthost forwarding an e-mail to a co-located server;
    using the co-located server to receive a selected message body and a header comprising a plurality of header elements wherein the message body and the header are associated with the e-mail;
    separating at least one of the header elements from the selected message body;
    selecting a template to wrap the e-mail on the basis of a predetermined e-mail count limiting the template from being applied to a number of e-mails greater than the predetermined e-mail count, the template being selected from a data source;
    extracting a set of content items from a website based at least in part on the template selected;
    a step for dynamically populating the template with the set of content items from the website to create a populated template;
    assembling the selected message body, the populated template and the header to create a wrapped e-mail wherein assembling includes searching threading information for proper display of an e-mail thread;
    sending the wrapped e-mail to a recipient.

2. The method of wrapping e-mail of claim 1, wherein the step of selecting a template further comprises the step of:
    selecting the template to form a border on at least one side of the selected message body.

3. The method of wrapping e-mail of claim 1, wherein a server receives the e-mail, the server being installed on an internal network.

4. The method of wrapping e-mail of claim 1, wherein a server receives the e-mail, the server being installed on an external network.

5. The method of wrapping e-mail of claim 1, wherein the step of selecting the template further comprises the steps of:
    a user creating a plurality of profiles in an e-mail client, each profile having an e-mail address unique to that profile; the user selecting the profile for use in determining the template.

6. The method of wrapping e-mail of claim 1, wherein the step of selecting the template further comprises the steps of:
    creating a template list; the template list having a plurality of template names;
    creating a sender list; the sender list having a plurality of sender e-mail addresses;
    assigning the sender e-mail addresses from the sender list to a template name in the template list.

7. The method of wrapping e-mail in claim 1, further comprising the steps of:
    creating a report based on the e-mail;
    writing the report to a file on a computer;
    storing the report in a database;
    sending the report to a manager.

8. The method of wrapping e-mail in claim 1, wherein the selected message body and the header are received in a RAW image format and a MIME standard.

9. The method of wrapping e-mail in claim 1, wherein the selected message body, the header and the populated template are sent using a RAW image format and a MIME standard.

10. A method of wrapping an e-mail, comprising the steps of:
    a computer receiving the e-mail, the e-mail having a selected message body and a header; the header having a plurality of header elements;
    separating at least one of the header elements from the selected message body;
    selecting a template to wrap the e-mail on the basis of a predetermined e-mail count limiting the template from being applied to a number of e-mails greater than the predetermined e-mail count, the template being selected from a data source;
    extracting a set of content from a website;
    populating the template with the set of content from the website to create a populated template;
    assembling the selected message body, the populated template and the header to create a wrapped e-mail wherein assembling includes searching threading information for proper display of an e-mail thread;
    sending the wrapped e-mail to a recipient.

11. The method of wrapping e-mail of claim 10, wherein the step of selecting a template further comprises the step of:
    selecting the template to form a border on at least one side of the selected message body.

12. The method of wrapping e-mail of claim 10, wherein a server receives the e-mail, the server being installed on an internal network.

13. The method of wrapping e-mail of claim 10, wherein a server receives the e-mail, the server being installed on an external network.

14. The method of wrapping e-mail of claim 10, wherein the step of selecting the template further comprises the steps of:
    a user creating a plurality of profiles in an e-mail client, each profile having an e-mail address unique to that profile;
    the user selecting the profile for use in determining the template.

15. The method of wrapping e-mail of claim 10, wherein the step of selecting the template further comprises the steps of:
    creating a template list; the template list having a plurality of template names;
    creating a sender list; the sender list having a plurality of sender e-mail addresses;
    assigning the sender e-mail addresses from the sender list to a template name in the template list.

16. The method of wrapping e-mail in claim 10, further comprising the steps of:
    creating a report based on the e-mail;
    writing the report to a file on a computer;
    storing the report in a database;
    sending the report to a manager.

17. The method of wrapping e-mail in claim 10, wherein the selected message body and the header are received in a RAW image format and a MIME standard.

18. The method of wrapping e-mail in claim 10, wherein the selected message body, the header and the populated template are sent using a RAW image format and a MIME standard.

19. A web based application system for wrapping an e-mail, comprising:
- a computer having a user interface, the user interface having a customer control panel;
- the customer control panel having an e-mail composer, a template manager, and a plurality of settings to configure a message processor;
- the customer control panel further comprising a really simple syndication (RSS) trigger for dynamically populating a template from a data source;
- the message processor applying the settings of the customer control panel to the e-mail;
- the template manager having at least one template, the template having an associated set of content items;
- a computer receiving the e-mail, the e-mail having a selected message body and a header; the header having a plurality of header elements;
- separating at least one of the header elements from the selected message body;
- selecting a template to wrap the e-mail on the basis of a predetermined e-mail count limiting the template from being applied to a number of e-mails greater than the predetermined e-mail count, the template being selected from a data source;
- assembling the selected message body, the template and the header to create a wrapped e-mail wherein assembling includes searching threading information for proper display of an e-mail thread.

20. The web based application system of claim 19, wherein the customer control panel further comprises a website control for populating the template in the template manager from a web site.

21. The web based application system of claim 19, wherein the customer control panel further comprises a means for extracting the associated set of content items associated with the template from a web site.

22. The web based application system of claim 19 wherein the customer control panel further comprises a bill paying module to pay an invoice online.

23. The web based application system of claim 19 wherein the customer control panel further comprises a means for bill paying.

24. The web based application system of claim 19 wherein the customer control panel further comprises a means for reporting a history of e-mail transactions.

* * * * *